US007665068B2

(12) United States Patent
Neumann et al.

(10) Patent No.: US 7,665,068 B2
(45) Date of Patent: Feb. 16, 2010

(54) METHODS AND SYSTEMS FOR TESTING SOFTWARE APPLICATIONS

(75) Inventors: Georg Neumann, Traunstein (DE); Vijay Redla, Belmont, CA (US); David Dieterich, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 764 days.

(21) Appl. No.: 10/735,482

(22) Filed: Dec. 12, 2003

(65) Prior Publication Data

US 2005/0132333 A1 Jun. 16, 2005

(51) Int. Cl.
*G06F 9/44* (2006.01)

(52) U.S. Cl. ........................ 717/125; 717/124; 717/127; 717/130

(58) Field of Classification Search ......... 717/124–235; 434/116
See application file for complete search history.

(56) References Cited

U.S. PATENT DOCUMENTS

| | | | | |
|---|---|---|---|---|
| 5,475,843 | A * | 12/1995 | Halviatti et al. | 717/124 |
| 6,031,531 | A * | 2/2000 | Kimble | 715/862 |
| 6,583,781 | B1 * | 6/2003 | Joshi et al. | 345/156 |
| 6,714,963 | B1 * | 3/2004 | Levine et al. | 709/203 |
| 6,889,337 | B1 * | 5/2005 | Yee | 714/1 |
| 7,107,174 | B2 * | 9/2006 | McGrath et al. | 702/123 |
| 7,162,526 | B2 * | 1/2007 | Dutta et al. | 709/229 |
| 7,171,588 | B2 * | 1/2007 | Friedman et al. | 714/38 |
| 2002/0085037 | A1 * | 7/2002 | Leavitt et al. | 345/765 |
| 2002/0188613 | A1 * | 12/2002 | Chakraborty et al. | 707/100 |
| 2004/0015862 | A1 * | 1/2004 | Dunn | 717/124 |
| 2004/0194065 | A1 * | 9/2004 | McGrath et al. | 717/124 |

OTHER PUBLICATIONS

J. Chen et al., "Specification-based Testing for GUI-based Applications", 2002.*

"Java 2 Platform, Standard Edition, v1.2.2 API Specification"; Copyright 1993-1999. Downloaded from http://java.sun.com/products/archive/j2se/1.2.2_017/download-docs.html Oct. 1, 2007.*

Steven et al. "jRapture: A Capture/Replay tool for observation-based testing" 2000, Proceedings of the 2000 ACM SIGSOFT international symposium on Software testing and analysis.*

Jessica Chen et al., "*Specification-based Testing for GUI-based Applications*," Software Quality Journal, 10, 2002, Kluwer Academic Publishers, pp. 205-224.

* cited by examiner

*Primary Examiner*—Jason Mitchell
(74) *Attorney, Agent, or Firm*—Townsend and Townsend and Crew LLP

(57) ABSTRACT

Embodiments of the invention provide systems, methods, software products and/or data structures for testing software programs. One exemplary set of embodiments provides a method for testing a software program. The method can be used in an object-oriented environment, and the software application can comprise a plurality of components.

39 Claims, 9 Drawing Sheets

METHODS AND SYSTEMS FOR TESTING SOFTWARE APPLICATIONS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the development of software applications and, specifically, to novel methods, systems and software products for testing applications during or after their development.

Software developers have at their disposal a variety of tools and methodologies for testing software applications under development. For instance, commercial products like WinRunner™, available from Mercury Interactive Corp., allow for relatively automated testing of applications using predefined scripts. In these and other ways, developers can test the behavior of applications given different inputs and operating environments. Generally, however, automated testing tools require the composition of scripts, which define the circumstances for the test, and which can themselves be cumbersome to develop. Thus, while current automated testing tools can be helpful in quality testing applications, they still require significant effort before any meaningful testing can be done.

Further, existing development tools are not well-suited for testing applications designed to be accessible to physically-disadvantaged users. The Americans with Disabilities Act ("ADA") contains provisions relating to providing accommodations for persons suffering from disabilities. The ADA, therefore, potentially could be used to ensure that that software programs are sufficiently accessible to allow employees with certain physical disabilities to use the programs in the performance of their jobs. For instance, a program might need to be accessible to sight-impaired users by, inter alia, allowing navigation by sound and/or announcing audibly the position of certain components, cursors and the like. To accommodate these provisions, various programming languages and development environments have begun to include appropriate development tools to facilitate the development of accessible applications.

Merely by way of example, the Java programming language, and in particular, recent editions of the Java Development Kit ("JDK"), developed by Sun Microsystems ("Sun"), include an Accessibility API to facilitate developing Java-based applications in compliance with the ADA. This API provides accessible classes to allow for the development of applications that are compliant with ADA requirements, including, for instance, by providing an accessibility context for each component in an application, such that the component can be audibly identified by reference to the accessibility context.

Currently, however, there are few satisfactory means for testing the accessible features of an application, other than manual evaluation of the accessibility context of a component for fidelity with that component's actual properties.

BRIEF SUMMARY OF THE INVENTION

Embodiments of the invention provide systems, methods, software products and/or data structures for testing software programs. For example, one set of embodiments provides a method for testing a software program. The method can be used in an object-oriented environment, and the software application can comprise a plurality of components. The method can include determining a cursor position, ascertaining an accessibility context associated with the cursor position, and identifying a component by reference to the accessibility context. The method can further include searching a component hierarchy for an object having an accessibility context matching the component's accessibility context and/or replaying an event by calling a program method defined by an accessibility role for the object.

Merely by way of example, in some embodiments, the accessibility context can have an accessibility role that defines a set of properties, including at least one program method, associated with the accessibility context. In other embodiments, the identified component can comprise the set of properties, including the at least one program method, defined by the accessibility role. Similarly, in some cases, the object comprises the set of properties, including the at least one program method, defined by the accessibility role.

Certain embodiments allow for the creation of a record of the component, which can be, inter alia, incorporated within a file, and specifically, an XML file. Further, the record of the component may be modified manually and/or automatically. Merely by way of example, modifying the record can comprise changing one or more properties of the component, changing an accessibility role of the component and/or identifying a different program method to be executed in replaying an event. Optionally, the procedures described above may be performed for a plurality of iterations, and a plurality of records may, therefore, be created.

In accordance with certain embodiments, replaying the event may comprise displaying a result of the event on a display device and/or writing a result of the event to a file. Optionally, the result of the event may be evaluated (for instance, to determine whether the result of the event matches an anticipated result and/or whether the component complies with the Americans with Disabilities Act).

In further embodiments, the cursor position can be determined in response to a trigger, which can be, inter alia, the execution of the program method a first time (such that, replaying an event optionally can comprise executing the program method a second time), a cursor entering and/or exiting a field, a user manipulating a mouse button and/or a hotkey on a keyboard. In particular embodiments, the user manipulating a hotkey can simulate execution of a program method, and "replaying" an event can comprise executing the program method a first time.

In accordance with various embodiments, the component may be, inter alia, a button, a window, a selectable component (including, merely by way of example, a checkbox, radio button and/or the like), a portion of text, an object tree, and the like.

A particular set of embodiments provides methods for determining a software program's compliance with the ADA. One exemplary method comprises determining a cursor position, ascertaining an accessibility context associated with the cursor position, identifying a component by reference to the accessibility context, searching a component hierarchy for an object having an accessibility context matching the component's accessibility context and analyzing the object to evaluate the component's compliance with the ADA. Merely by way of example, analyzing the object can comprise evaluating the object's accessibility context and/or accessibility role to determine whether the component properly implements accessibility features.

Another set of embodiments provides computer program products for testing software programs and/or determining a software program's compliance with the ADA. For example, some embodiments provide a computer program product embodied in a computer readable medium and comprising instructions executable by a computer to implement methods of the invention.

Further embodiments provide systems for testing software programs and/or determining a software program's compliance with the ADA. Merely by way of example, one exemplary system includes a processor, an input device in communication with the processor and a computer readable medium in communication with the processor. The computer readable medium can comprise instructions executable by the processor to perform methods of the invention. The system can include a mouse having at least one button and/or a keyboard having at least one hotkey. The system can further include a display device, which can be used, inter alia, to allow a user to control the recording/replay of an event and/or to display the replayed event (and/or its results).

Yet another set of embodiments provides data structures that can be used in implementing methods of the invention. On exemplary data structure can comprise one or more records of a component. The record(s) each can comprise information about an identified component, including for example, an accessibility role associated with an accessibility context for the component. The accessibility role can define a set of properties, perhaps including at least one program method, associated with the component, such that the record can be compared with an object in a component hierarchy to determine whether the object has an accessibility context matching the component's accessibility context. Optionally, if the object's accessibility context matches the component's accessibility context, an event can be replayed by calling a program method associated with an accessibility role for the object.

A further understanding of the nature and advantages of the present invention may be realized by reference to the remaining portions of the specification and the drawings.

DETAILED DESCRIPTION OF THE INVENTION

Figure 1:
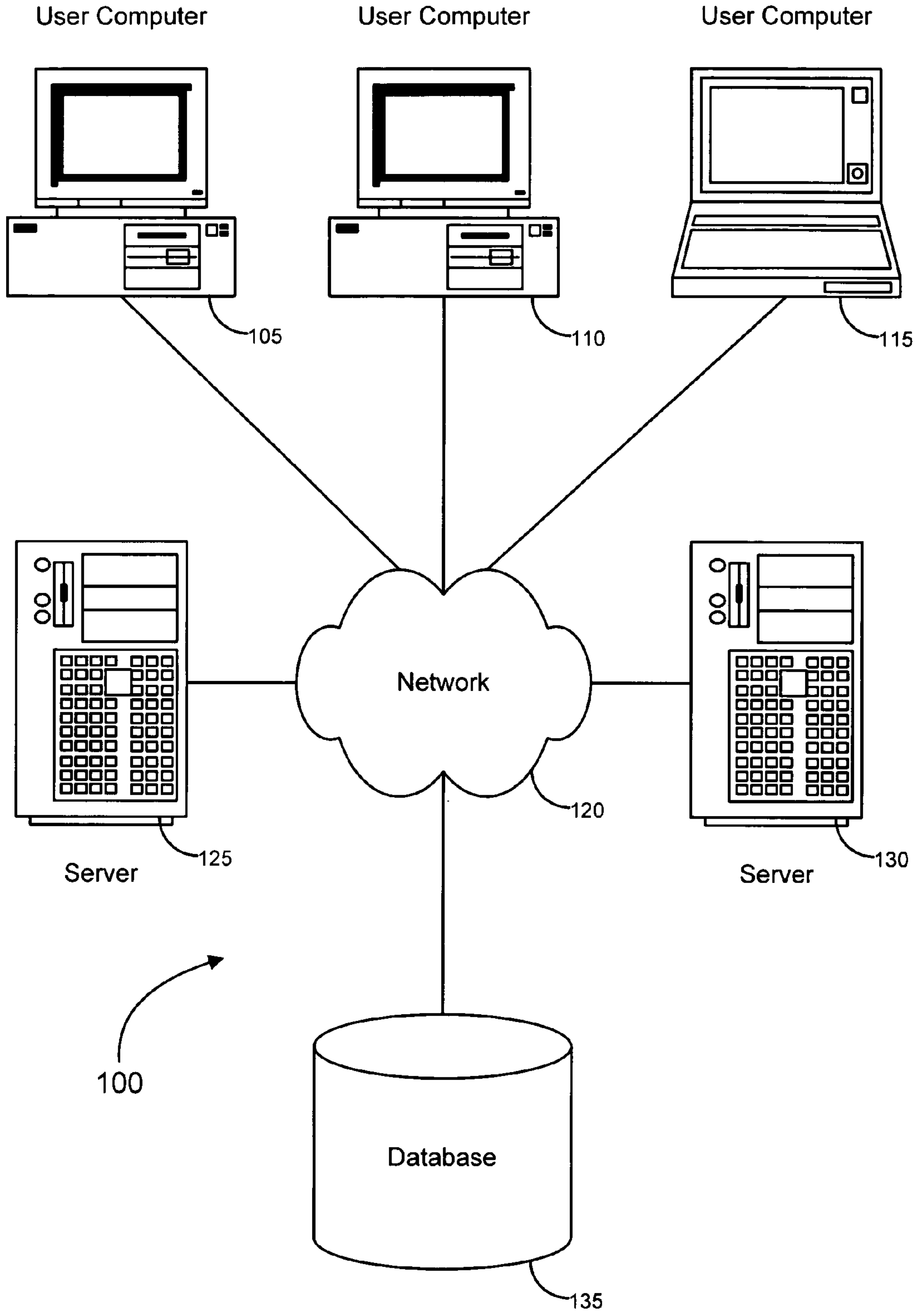
FIG. 1 is a schematic diagram of a computer network system that can be used to test software programs in accordance with various embodiments of the invention.

The figures illustrate one or more exemplary embodiments of the invention, which are described in detail in the remaining portions of the specification. In the figures, like reference numerals are used throughout to refer to similar elements. In some instances, a sub-label consisting of a lower case letter is associated with a reference numeral to denote one of multiple similar elements. When reference is made to a reference numeral without specification to an existing sub-label, it is intended to refer to all such multiple similar elements.

1. Overview

Embodiments of the invention provide novel methods, systems, data structures and products for testing software programs and/or ensuring compliance with the Americans with Disabilities Act. (It should be noted that, although the general terms "application" and "software program" are used herein to refer to software being developed and/or tested, the term is used in a broad sense to include applets, servlets, code fragments, scripts, code libraries and any other portion of software code, which can be designed to stand alone, be called from and/or incorporated within a web page (static or dynamic) and/or function as part of and/or in conjunction with other software programs.)

Certain embodiments of the invention utilize the accessibility features of modern development environments in new and useful ways to enable efficient and effective testing. Merely by way of example, some embodiments use the accessibility API provided as part of (and/or in addition to) Sun's JDK, including without limitation the accessible classes packaged with that API, although other embodiments can be used with other development environments, so long as those environments provide a way for a developer to obtain an accessibility context of various components within applications developed in that environment.

These accessibility classes provide objects, including, for example, accessible contexts, that can allow a developer to determine the context of components in an application, including the relative location of that component on a display screen. In addition, the accessibility classes can provide each object with an accessible role, which defines certain properties of that object, including one or more methods that can be executed by or on the object. Those skilled in the art will appreciate that a component that inherits from a class with an accessible role will also generally inherit the properties and/or methods associated with that role.

In accordance with embodiments of the invention, therefore, a software program may be developed in a development system that provides these accessibility features. As used in this application, the term "development system" can identify a programming language, an IDE (integrated development environment), any associated APIs, and/or any other tools generally used by those skilled in the art to develop software applications. One illustrative example of a development system that can be used in accordance with embodiments of the invention is the JDeveloper Suite® commercially available from Oracle Corp., which can be used in conjunction with Sun's JDK, as well as other programming languages and/or development systems. Those skilled in the art will recognize, however, that embodiments of the invention can be used with other development systems as well.

Often, such development systems are object-oriented, a characteristic that, as those skilled in the art will appreciate, allows for development of an application by instantiating components from a variety of pre-defined classes and/or objects, such that the components inherit certain properties and methods of those classes and/or objects. A developed software application, therefore, can include a plurality of components. The term "component" is used in a broad sense herein to denote any software control, part, etc. from which a software program may be developed in an object-oriented environment, and can include, without limitation, windows, frames, panels (including without limitation tabbed panels), scroll bars, menus, menu items, buttons, list boxes, combo boxes, labels, object trees (and/or items included therein, including without limitation any tree node implemented in and/or derived from, for example, the Java Swing tree known to those skilled in the art), text components, and the like. Merely by way of example, in accordance with some embodiments, a component can comprise any object associated with a role defined by the JDK. Each of these components can have a variety of properties and/or program methods, which can be inherited from the class and/or object the component instantiates and/or can be configured manually on a component-by-component basis.

In some embodiments, the development system can provide an accessible role (also referred to herein as an "accessibility role") for one or more objects (or classes of objects) that can be used to instantiate a component. The accessible role can identify certain properties and/or program methods for a given component, facilitating the development of accessible applications. In particular, the accessible role can be associated with an accessible context (or "accessibility context") for the instantiated component. This accessible context can help identify the component, from a variety of perspectives, in the application. Merely by way of example, a component's accessible context can be used to identify a component by reference to a cursor position in the application. Alternatively, a component's accessible context can be used to identify that component by function, etc. As described in detail below, a component identified by reference to its accessible context can be queried to determine, inter alia, the accessible role for that component, and the accessible role can be used to access and/or call program methods, identify and/or change properties of the component, and/or the like.

In accordance with some embodiments of the invention, therefore, a development system can include classes and/or methods that can use these accessibility features to test an application. Merely by way of example, in a development system used with the JDK, these classes can be embodied in an API (a "test API") and/or Java Archive ("JAR") file familiar to those skilled in the art, allowing for modification and/or extension of these features by the addition or substitution of one or more other JAR files. (Although the term "test API" is used herein for convenience, embodiments of the invention need not function as a traditional API to a development system and/or software program being tested. For instance, the test API may, in fact, comprise a separate application designed for testing software programs. In describing the test API, therefore, the term "API" is meant only to convey that the test API can have programmatic access to the software program being tested.)

If the test API is embodied in one or more JAR files, those JAR files can be added to an appropriate location in the JDK's standard class structure. Likewise, an accessibility API can be embodied by one or more JAR files in the JDK class structure. If desired, the accessibility API and the test API can be included in the same file. Those skilled in the art will appreciate that the location and/or packaging of these features will depend upon the development system used. In an exemplary set of embodiments, the test API and the accessibility API can be embodied in separate files placed in the /JRE/LIB/EXT directory in the JDK directory tree. Alternatively, these components, and in particular the test API, can be integrated directly into (e.g., compiled with) the development system. In some cases, the test API can utilize a scripting language (such as PERL, JavaScript, TCL and/or the like) to facilitate recording and/or replay of components, events and/or operations.

Thus, in some embodiments, the test API can comprise a stand-alone testing application. In other embodiments, as described in detail below, the test API can be used, along with the accessibility API, from within (and/or in conjunction with) a development system to test the behavior and/or properties of components in a software program. During testing, the software program under development itself may be run (e.g., in a test mode, etc.) within the development system and/or the software program may be run as a stand-alone application and/or component for another application. Because the test API can, in many cases, interoperate with the development system, it can access the components in the program quickly and efficiently, mitigating the need for the developer to spend significant time developing a testing regime.

For example, the test API can test any components instantiated from a standard class and/or object, as well as any additional components created from any classes and/or objects registered with the development system. Hence, the developer need not (but may, if desired) provide a "dictionary" of objects to be tested. Further, the test API need not (but may, if desired) resort to any operating system parameters (such as a screen position within the operating system) to identify components. Thus, even if a component is moved within the framework of the application (for instance, moving the position of a button on the screen), the test API still can identify and/or test the component. In these and other ways, various embodiments of the invention provide robust testing features heretofore unknown in the art.

Merely by way of example, in accordance with certain embodiments, certain events and/or actions can be "recorded" for replay and/or evaluation by, inter alia, identifying a component with which the event is associated and subsequently calling one or more methods contained by and/or associated with that component (and/or an object with an accessibility context matching the component's accessibility context) to replay the event. Embodiments of the invention can therefore support, inter alia, automatic and/or manual recording of mouse and/or keyboard actions in the software program and/or development system, various text operations (insertion, deletion, highlighting, overwriting, etc.), component verification (e.g., verification that the component/text is in a specific state during testing) and the like. In certain embodiments, components can be tested iteratively and/or after a delay, to determine (on specified intervals, if desired) the status of the component at particular times, which, as those skilled in the art will appreciate, can be helpful for testing time-sensitive operations. Similarly, various embodiments of the invention can be used to test step timings for operations and resource (e.g., heap memory) consumption for operations.

These and other features are discussed below with respect to specific exemplary embodiments.

2. Exemplary Embodiments

Turning now to the figures, several exemplary embodiments of the invention will be described in detail. For instance, FIG. 1 illustrates a schematic diagram of a system 100 that can be used in accordance with one set of embodiments. The system 100 can include one or more user computers 105, 110, and 115. The user computers 105, 110, and 115 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105, 110, 115 can also have any of a variety of applications, including one or more development systems, database client and/or server applications, and web browser applications. Alternatively, the user computers 105, 110, and 115 can be any other electronic device,. such as a thin-client computer, Internet-enabled mobile telephone, and/or personal digital assistant, capable of communicating via a network (e.g., the network 120 described below) and/or displaying and navigating web pages or other types of electronic documents. Although the exemplary system 100 is shown with three user computers, any number of user computers can be supported.

Certain embodiments of the invention operate in a networked environment, which can include a network 120. The network 120 can be any type of network familiar to those skilled in the art that can support data communications using any of a variety of commercially-available protocols, including without limitation TCP/IP, SNA, IPX, AppleTalk, and the like. Merely by way of example, the network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 125, 130. One server may be a web server 125, which can be used to process requests for web pages or other electronic documents from user computers 105, 110, and 120. The web server can be running an operating system including without limitation any of those discussed above, as well as any commercially-available server operating systems. The web server 125 can also run a variety of server applications, including HTTP servers, FTP servers, CGI servers, database servers, Java servers, and the like. In some embodiments of the invention, a development system can be operated within a web browser on one or more of the user computers 105, 100, 115. In these embodiments, all user interaction with the development system can take place via web pages sent to user computers via the web server 125.

The system 100 can also include one or more file and or/application servers 130, which can, in addition to an operating system, include one or more applications accessible by a client running on one or more of the client computers 105, 110, 115. Merely by way of example, the server(s) 130 can be one or more general purpose computers capable of executing programs or scripts in response to the user computers 105, 110 and 115, including without web applications. The web application can be implemented as one or more scripts or programs written in any programming language, such as Java™, C, C#™ or C++, and/or any scripting language, such as Perl, Python, or TCL, as well as combinations of any programming/scripting languages. The application server(s) 130 can also include, database servers, including without limitation those commercially available from Oracle, Microsoft, Sybase™, IBM™ and the like, which can process requests from database clients running on a user computer 105. In some embodiments, an application server 130 can create web pages dynamically for displaying the development system. The web pages created by the web application server 130 can be forwarded to a user computer 105 via a web server 125. Similarly, the web server 125 can receive web page requests and/or input data from a user computer 105 and can forward the web page requests and/or input data to the web application server 130.

In accordance with further embodiments, the server 130 can function as a file server and/or can include one or more of the files necessary for operation of a development system running on a user computer 105. Alternatively, as those skilled in the art will appreciate, the file server 130 can include all necessary files, and the development system can be invoked remotely by a user computer 105. Although for ease of description, FIG. 1 illustrates a separate web server 125 and file/application server 130, those skilled in the art will recognize, based on the disclosure herein, that the functions described with respect to these servers 125, 130 can be performed by a single server and/or a plurality of specialized servers, depending on implementation-specific needs and parameters.

In certain embodiments, the system can include a database 135. The location of the database 135 is discretionary: it can reside on a storage medium local to (and/or resident in) one or more of the computers 105, 110, 115, 125, 130. Alternatively, it can be remote from any or all of the computers 105, 110, 115, 125, 130, so long as it can be in communication (e.g., via the network 120) with one or more of these. In a particular set of embodiments, the database 135 can reside in a storage-area network ("SAN") familiar to those skilled in the art. (Likewise, any necessary files for performing the functions attributed to the computers 105, 110, 115, 125, 130 can be stored locally on the respective computer and/or remotely, as appropriate.) In one set of embodiments, the database 135 can be a relational database, such as Oracle 9i™, that is adapted to store, update, and retrieve data in response to SQL-formatted commands.

Figure 2:
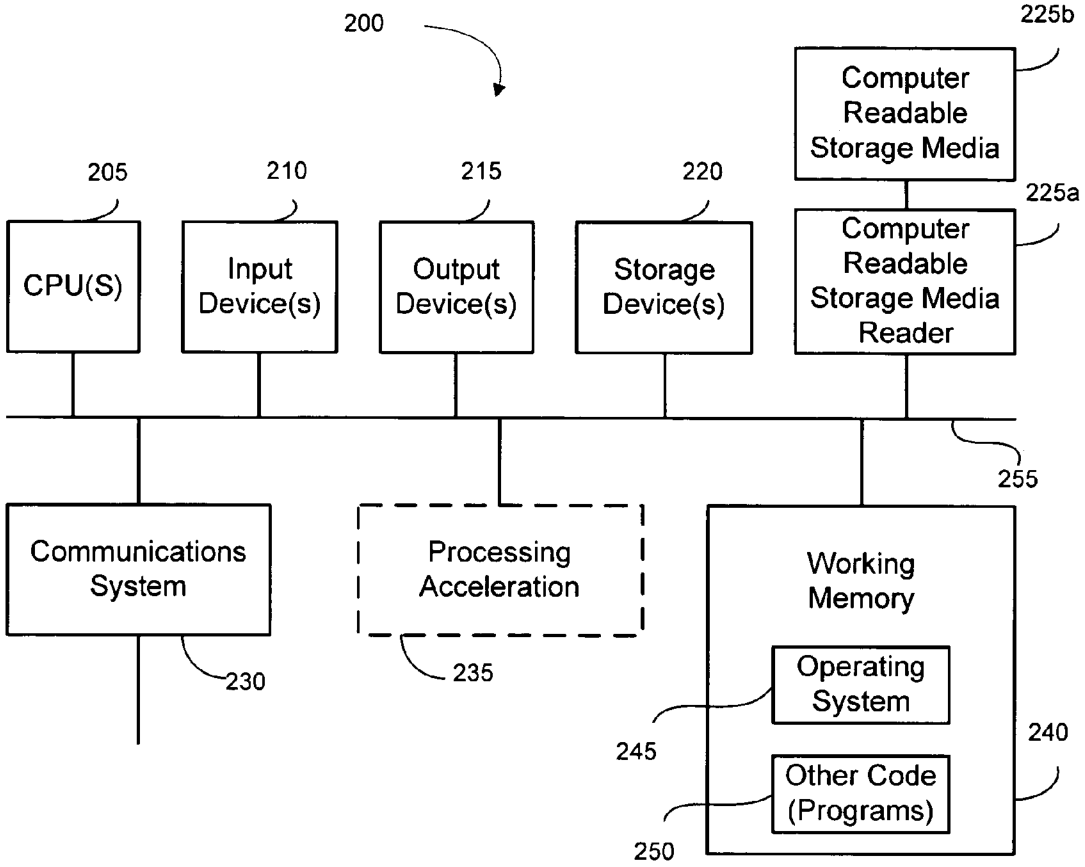
FIG. 2 is a schematic diagram of a computer system that can be used to test software programs in accordance with various embodiments of the invention.

FIG. 2 provides a schematic illustration of one embodiment of a computer system 200 that can perform the methods of the invention and/or the functions of a user computer and/or server computer, as described herein. This figure broadly illustrates how individual system elements may be implemented in a relatively separated or relatively more integrated manner. The computer system 200 is shown comprising hardware elements that can electrically coupled via a bus 255, including a processor 205; an input device 210, which can include without limitation a mouse, a keyboard and/or the like; an output device 215, which can include without limitation a display device, a printer and/or the like; a storage device 220, which can include without limitation a disk drive, an optical storage device, solid-state storage device such as a random access memory ("RAM") and/or a read-only memory ("ROM"), which can be programmable, flash-updateable and/or the like; a computer-readable storage media reader

225*a*; a communications system 230; which can include without limitation a modem, a network card (wireless or wired), an infra-red communication device, and/or the like); a processing acceleration unit 235, which can include a DSP, a special-purpose processor and/or the like; and a memory 240, which can include a RAM or ROM device, as described above.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 120 and/or any other computer described above with respect to the system 100.

The computer system 200 also can comprise software elements, shown as being currently located within a working memory 240, including an operating system 245 and/or other code 250, such as an application program as described above and/or designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 3A:
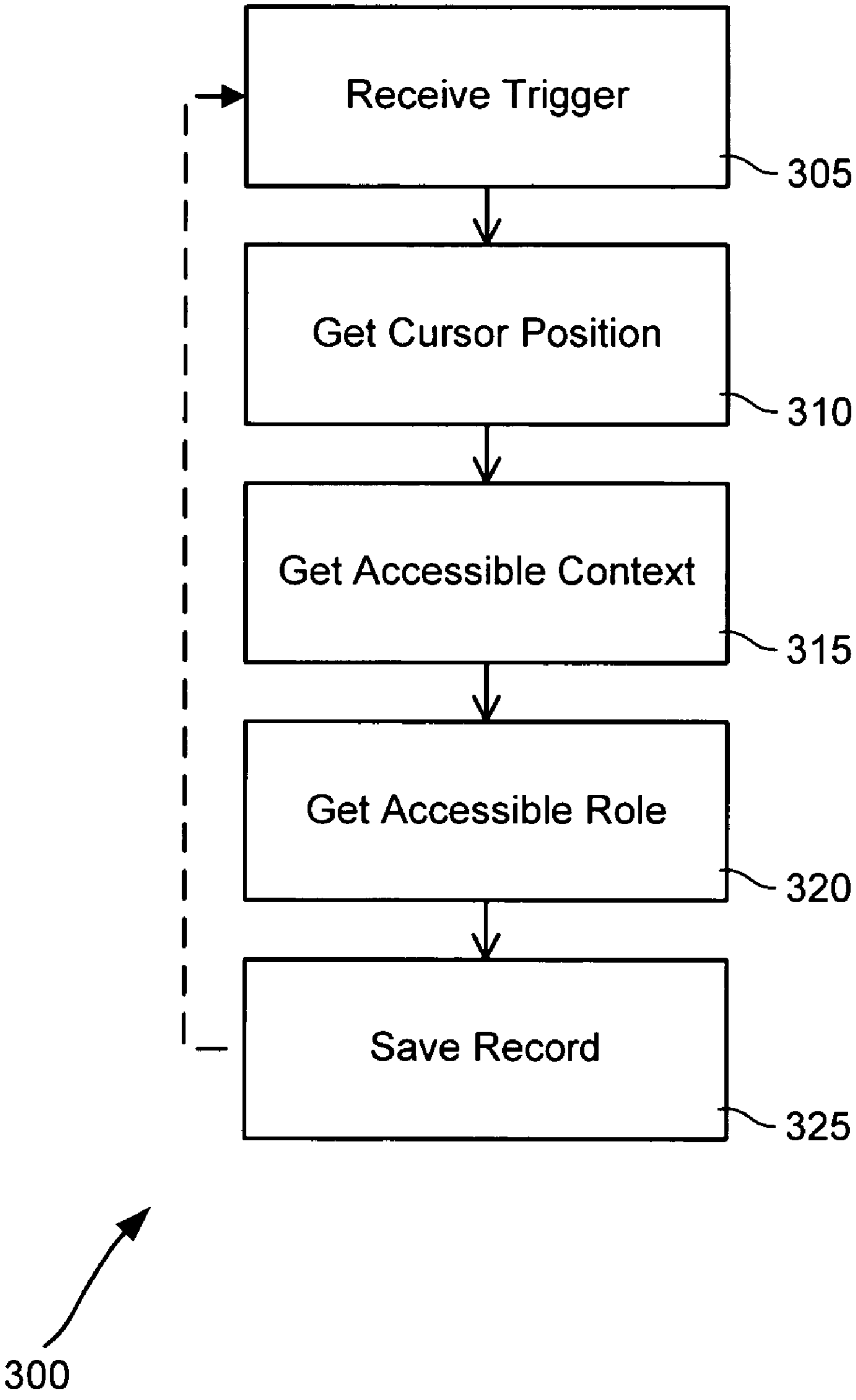
FIG. 3A is a process flow diagram illustrating a method of identifying a software component in accordance with various embodiments of the invention.
Figure 3B:
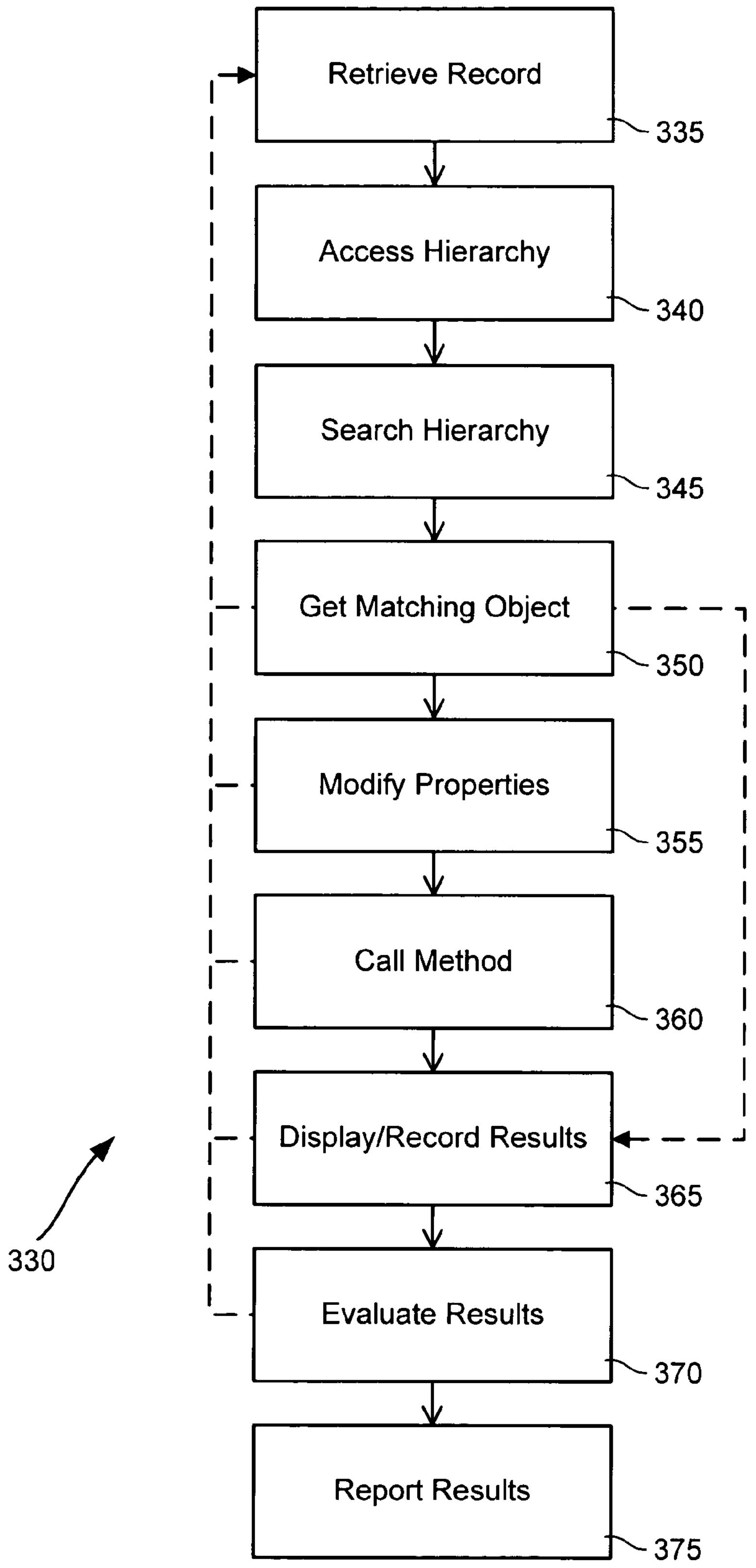
FIG. 3B is a process flow diagram illustrating a method of testing a software component in accordance with various embodiments of the invention.

FIGS. 3A and 3B together illustrate a method of testing a software program in accordance with one set of embodiments of the invention. FIG. 3A is a process flow diagram illustrating a method 300 for testing applications. Although the method 300 may be implemented by a system such as the exemplary systems 100 and 200 described above (and, for ease of illustration, may be described hereinafter by reference to these systems), it should be appreciated that embodiments of the invention are not limited to any particular implementation or system. Further, while the method 300 is illustrated organizationally by a process flow diagram for purposes of description, it should be noted that, unless the context clearly dictates otherwise, each of the illustrated procedures may be performed in an order different than illustrated and/or may be omitted entirely, depending on the embodiment.

Some embodiments of the invention provide for the testing of an application through recording the application's behavior in certain circumstances (e.g., in response to user interaction with the application) and, optionally, replaying and/or otherwise evaluating the recorded behavior. Particular embodiments use accessibility features (e.g., as described above) to facilitate the recording, evaluation and/or playback of events. In this way, both the general behavior of the application (and/or certain of its components), as well as the accessibility of the application (and/or components), can be evaluated quickly and easily.

In particular embodiments, the recording of events can be continuous, as the software program is used, providing a way to test the program under normal usage. In other embodiments, certain events can be recorded; for instance, if a particular component needs to be tested under certain circumstances, the program can be placed in the proper state, and recording then can be initiated.

In accordance with the illustrated method 300, a trigger can be received (block 305). Those skilled in the art will recognize that many development systems facilitate the development of applications by "firing" events within the application in certain circumstances, including without limitation when the status and/or properties of a component have changed (e.g., when a check box has been selected or deselected), when a particular component receives focus within the application (e.g., when a cursor enters a text entry field), and/or the like. Further, many development systems provide a notification queue for allowing a developed software program to sense when events are fired. The firing of an event can serve as a trigger in accordance with embodiments of the invention. In addition, user operations can serve as triggers. Merely by way of example, the user's manipulation of a mouse button (i.e., "clicking" the mouse button) can be a trigger. (Of course, the user operations may fire an event as well, and that event can serve as the trigger.)

Further embodiments of the invention allow for the use of hotkeys as triggers. For instance, the development system can be configured to interpret a certain hotkey (e.g., the F12 key) as a hotkey. Embodiments of the invention provide for several different uses of hotkeys. In particular, as described in detail below, a hotkey can be used to emulate a user's action and/or an application's behavior, without registering that action or actually causing that behavior to occur. Merely by way of example, a hotkey can be configured to emulate the manipulation of a mouse button for testing purposes, without actually registering a mouse click event in the application being tested. Thus, in situations in which a mouse click might change the state of the application (e.g., when the mouse cursor is located on the "Exit" entry of the "File" menu, such that manipulation of the mouse button would result in the software program and/or development system closing) a hotkey can be used to record and/or test the behavior of the application in response to that user interaction, without actually registering that interaction within the program or triggering a response within the program. Different hotkeys can be configured to emulate different events; thus, for instance, one hotkey can emulate a single mouse click, while other hotkeys can emulate a double-click, a right-button click, manipulation of the Enter key, and the like.

At block 310, a cursor position can be determined. This procedure can be initiated in response to a specific trigger, as described above. Alternatively, for example in a continuous-recording mode, the cursor position can be dynamically determined without the need for a trigger. Generally, modern development systems provide methods for ascertaining a cursor position. For instance, the JDK method "getCurrentMousePosition( )" can be called within an event queue monitor object (known to those skilled in the art) and can return the mouse position (for instance, by returning X-Y coordinates in a Cartesian plane and/or by another frame of reference). Alternatively, any other suitable method may be used, so long as the position of the cursor within the application and/or the operating system's windowing system can be determined with reasonable precision, and a reference to that position can be returned to the development system and/or the test API in a suitable format.

Based on the cursor position, the accessibility API can allow the development system to locate the component currently referenced by the mouse pointer and/or cursor position. For instance, in the accessibility API, the method "getAccessibleAt" can be called with the returned mouse/cursor position as a parameter, and the method will return the accessible component associated with the location of the mouse/cursor position. Further, the accessible context of that component may be ascertained (block 315), for instance by calling a method such the JDK's "getAccessibleContext( )," which is a method of the returned accessible component and inherited as part of the accessible interface for the JDK.

In accordance with some embodiments of the invention, any given accessible context is unique within an application. The accessible context of a component, therefore, can serve to identify that component within the application. Moreover, the accessible context can include an accessible role, which defines certain properties and/or methods associated with (and/or contained in) the component identified by the accessible context. An accessible role, therefore, could identify a particular component as, for instance, a button and could provide a set of properties (e.g., size, appearance) for that component, as well as one or more methods that can be invoked by, on, and/or with respect to that component.

At block 320, the system retrieves the accessible role for the component identified with respect to the mouse/cursor position. The accessible role can be retrieved by, for instance, calling the method "getAccessibleRole( )," from within the accessible context for the identified component. In addition, the accessible context for a component can provide the name and/or description for that component, and those values may be returned by appropriate methods included in the accessible context for the component. In this way, for instance, the component can be identified.

Optionally, a record can be made of one or more identified components and/or related events (including, for instance, the triggering events that prompted the identification) (block 325). The record can be used to store information about the identified components, including information that can be used to replay events in order to test the components and/or evaluate the components' compliance with the ADA, as described in more detail below. The record can comprise information including (without limitation) the accessible context and/or identity of the component, the accessible role of the component, the properties of the component and/or methods associated with the component, and/or information about the recording of the event, including without limitation any circumstances (e.g., triggering events etc.) that caused the component to be identified, the date and/or time of the recording/identification, any pertinent system or program parameters, and the like. Thus, the record of identified components may be used as a test script, which, as detailed below, can be modified manually and/or automatically as desired and which therefore can be used to test the software application and/or identified components under a great variety of operating circumstances.

In various embodiments of the invention, the record can take a variety of forms. Merely by way of example, the development system and/or test API can interface with a database (for instance, a relational database as described above), and the record of the component can be a record within that database. Alternatively, the record can be stored temporarily (e.g., in RAM) during a testing session and can be displayed by the development system and/or test API. In still other embodiments, the record can be written to a file on a storage medium associated or in communication with the computer on which the development system is running. The file can have any desirable format, including any commonly-known data storage format such as comma-separated-value ("CSV") and other structured data storage formats. In a particular set of embodiments, the record can be stored in an XML file, which allows for the "tagging" and efficient recall of pertinent information, as described in detail below.

Notably, more than one record can be stored in a single XML file; thus if the testing of a software program requires the testing of several components (or even a single component in a variety of circumstances), records of each of those components (and/or circumstances) can be saved in the XML file. The file can be stored locally or remote from the computer system on which the development system is running, and the XML file can be used to evaluate (and/or modify) the accessible context, accessible role, properties and/or methods associated with any identified components.

As desired, the identification of components and/or storage of records (blocks 305-325) may be performed as need for additional components and/or circumstances.

Embodiments of the invention can allow the replay of an event associated with a given component, in order to test that component. FIG. 3B illustrates an exemplary method 330 for recalling a software component and, if desired, replaying an event associated with the component. In some cases, a record of the component will have been stored (as described, for example, with respect to FIG. 3A above). The method 330, then, can comprise retrieving a record (block 335), which may have been stored in RAM, in a database and/or in a file, as discussed above. Retrieving the record can comprise, inter alia, reading the contents of one or more RAM addresses, parsing a file (e.g., an XML file) and/or issuing a SQL query to find the relevant information about a previously identified component. Such relevant information can include, without limitation, the accessibility context of the component, the accessibility role of the component, properties and/or methods associated with the component, and/or the circumstances under which the component was identified.

An object and/or component hierarchy can then be accessed (block 340), e.g., by the development system. The hierarchy can comprise a "tree" of objects and/or components, which can be searched for an object having an accessible context similar (or identical) to that of the identified component. Merely by way of example, many development systems provide methods for accessing the relevant hierarchy. In the JDK environment, for example, the methods "getTopLevelWindowWithFocus( )" and/or "getTopLevelWindows( )," if called with respect to an event queue monitor, will return a window object and/or array of window objects. The appropriate window object can serve as a container for all of the component objects used within that window, such that calling these methods while a software program is in the top level window will return a hierarchy of all components within that software program.

Next, the hierarchy can be searched for an object with an accessibility context similar to that of the identified component (block 335). Merely by way of example, the following pseudo-code fragment is illustrative of one of many procedures suitable for searching the hierarchy, where the term "identified_context" represents the accessibility context of the identified component:

```
count = AccessibleContext.get.AccessibleChildrenCount( );
for (int I=0; I < count; I++)
{
    accessible = AccessibleContext.getAccessibleChild(I);
    ac = accessible.getAccessibleContext( );
    if ac = identified__context then
    {
        return accessible
        exit loop
    }
}
```

Based on the disclosure herein, one skilled in the art will recognize that this procedure may be implemented for each node in the hierarchy until an object with a matching accessible context has been found. If, after searching the hierarchy, no matching object has been found, the system can return an error code, indicating that the testing has failed. If a matching object has been found, it can be returned as the result of the search (block 350), using any method known in the art for returning an object as a result of a called program method.

In some cases (including, for example, cases in which a software program is being tested to ensure that all components have a valid accessibility context, e.g., to ensure compliance with the ADA), merely finding an object in the object hierarchy with an accessibility context matching that of the identified component may be considered a successful result, and the test regime can be concluded with respect to the identified component, perhaps by logging, displaying and/or recording a successful (or unsuccessful, as appropriate) result, as described below. (Optionally, the hierarchy can be searched (blocks 335-350) with respect to other identified components.) In other cases, however, further testing may be desired and/or necessary, for instance to evaluate the behavior of the identified component under the test circumstances.

If desired, the properties of the returned object can be manually modified (block 365), e.g., by presenting a window to the user showing the properties that may be modified and/or by saving the returned object to a file and/or database record (perhaps using a procedure described above) and allowing the user to modify the file/record before proceeding with testing. Again, the search procedure (blocks 335-355) optionally may be repeated iteratively for a plurality of identified components before proceeding with testing.

At this point, one or more method(s) associated with the identified components (and, in particular, the objects with accessibility contexts matching those of the identified components) may be called by the test API (block 360) to replay an event associated with that component. (As illustrated, the process can be repeated for additional identified components.) The event may be the event that triggered the identification of the component in the first place and/or may be an event that was emulated by pressing a hotkey.

As mentioned above, the accessible role for a component can identify one or more methods associated with that component. In certain embodiments, therefore, the test API can refer to the accessible role for the object to determine what method should be called. Merely by way of example, if the accessible role for the object identifies that object as a button, the test API can call a “click” method for that component. Similarly, if the object’s accessible role is text, the text can be cut, copied, highlighted, pasted, overwritten, etc. by using methods related to the accessible role and/or inherited from the relevant class(es) in the development system, and if the object is a tree, the tree can be expanded, scrolled to a particular node, collapsed, etc., based on the methods inherited by that object. As a further example, if the identified component is a window, the accessible role can specify that methods include opening the window, closing the window, resizing the window, moving the window, giving the window focus, etc.

In some cases, the accessible role for the object can define, on its own, the method(s) that should be called. In other cases, the record of the identified component may include information about the method to be called, as mentioned above. In those cases, the record of that component may be consulted by the test API to determine which method should be called. In still other cases, the user may be prompted to identify one or more methods that should be called, e.g., by presenting the user with a window and/or allowing the user to specify in a file which method should be called. In certain embodiments, the user can be given an opportunity to specify the method(s) to be called at the same time (and/or in the same way) the user is given the opportunity to modify the object’s properties (i.e., as described above with respect to block 355).

After an event has been replayed, the results of that event may be displayed and/or recorded (block 365). In many cases, displaying the results of an event may be simultaneous with the replay of the event, e.g., by displaying the replay of the event itself. For instance, if the replayed event is the activation (“click”) of a button component, the system may be configured to fire the event in real time, displaying for the user the behavior of the software program during and/or in response to the event. Alternatively and/or in addition, the result of the event may be saved and/or displayed at a later time. For instance, if the called method returns a value, a record of that value may be saved (perhaps in one of the manners discussed above) for later inspection, printing, etc. In addition, the result of an event (particularly, but not necessarily, if the result varies from the expected result) may be logged to a file, database, etc. (thereby providing a record of, inter alia, timing and/or resource consumption data at various points during the test regime) and/or ignored, e.g., to allow testing to proceed even if testing for a particular event “fails.” Optionally, if a test result varies from the desired result, the test API can be configured to “roll back” the properties of a component to a defined “last-known-good” state to allow testing to continue under simulated “normal” conditions.

If appropriate, multiple events, each associated with one or more identified components, may be replayed sequentially. For example, if a series of user actions resulted in the identification of multiple components (e.g., if the test API was operating in a continuous recording mode), those actions can be replayed in order. Hence, embodiments of the invention can provide an easy and efficient way to script actions by recording those actions and replaying them in order (with modification of object properties and/or methods as desired).

Optionally, the results of the replayed event(s) may be evaluated (block 370). Evaluation of the results may be automated and/or performed manually. Merely by way of example, the user may simply view the replay of the event(s) (perhaps with modification of component properties and/or methods) to analyze whether the software program behaves as intended under a variety of circumstances. Alternatively, a series of recorded results may be evaluated by the test API (and/or a separate evaluation program) to analyze whether the returned results of each event match anticipated return values. In this way, for instance, a software program (and/or certain components thereof) may be evaluated to determine whether the program (and/or its components) properly implement accessibility features (and thereby comply with the ADA, for example).

In other embodiments, test results may be reported (block 375), e.g., by reporting information about the status of components at various points during replay; error information generated during replay; program and/or operating system information; nature and/or number of tests performed, passed, failed, etc.; elapsed testing time; and the like. Reporting of the test results can take any of a variety of forms, including updating a database with the reported information, displaying the reported information on a display (e.g., in a reporting window of the test API and/or development system), saving reporting information to a file, storing reporting information in a database, posting reporting information to a web site and the like.

Figure 4:
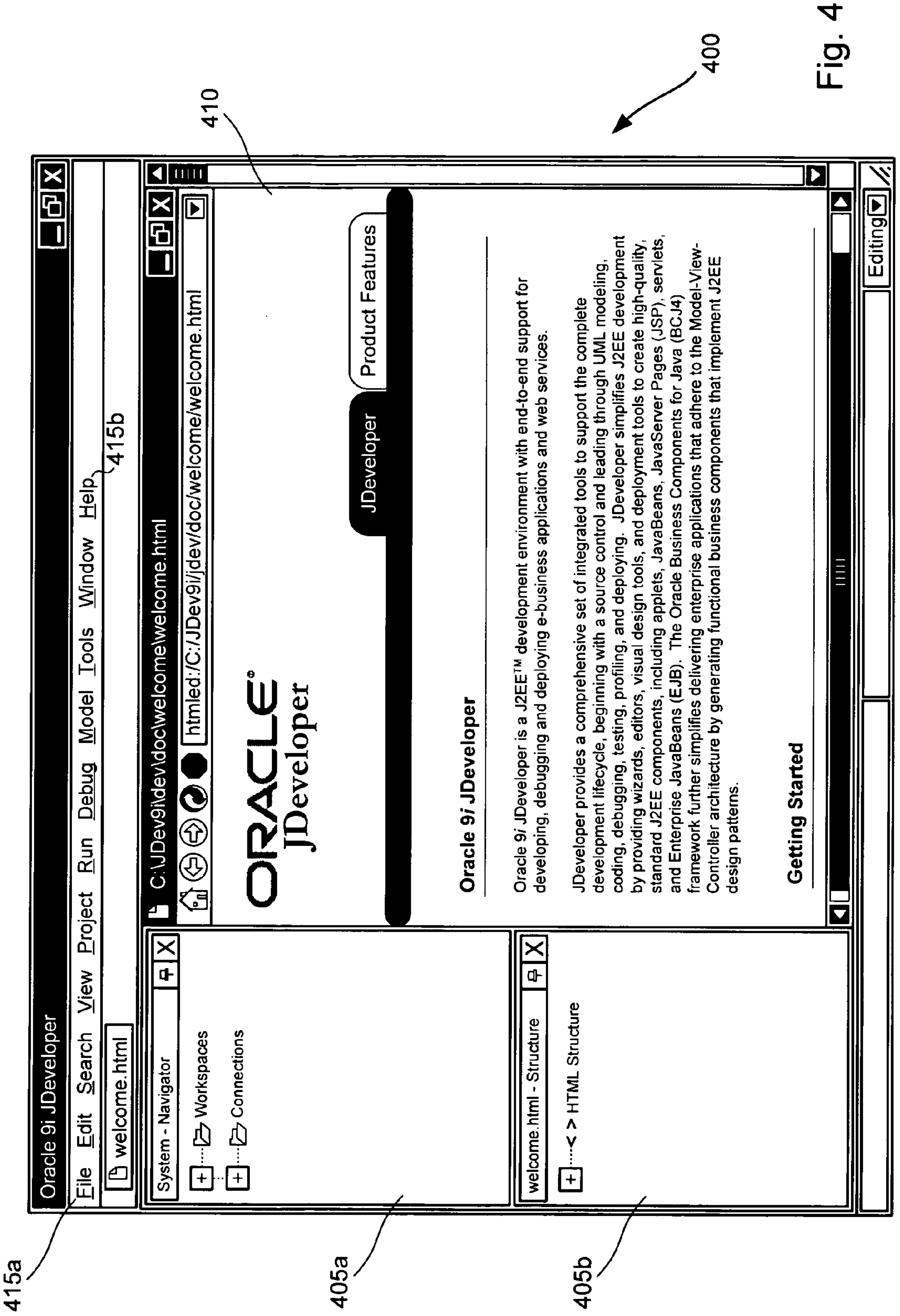
FIG. 4 is an exemplary screen display illustrating a typical integrated development environment that can be used to develop software programs to be tested in accordance with embodiments of the invention.

In some implementations, the methods 300 and/or 330 may be (but need not be) implemented within a development system, as described generally above. FIGS. 4-8 illustrate a set of embodiments of the invention running in an exemplary development system. FIG. 4 provides an exemplary screen display 400 illustrating a typical development system that can be used to implement certain embodiments of the invention. The development system can include one or more control windows 405, which can be used to view and/or modify the properties of varies components in an application under development and/or view other development parameters (variables, code structure, etc.).

The display 400 can also include an application window 410, which can display the software program under development and/or testing. In particular embodiments, the application window 410 can allow for user interaction with and/or operation of the software program being developed and/or tested. The development system can further include one or more menus 415 and/or toolbars, which can control the software program in the application window 410 and/or the development system itself.

Figure 5:
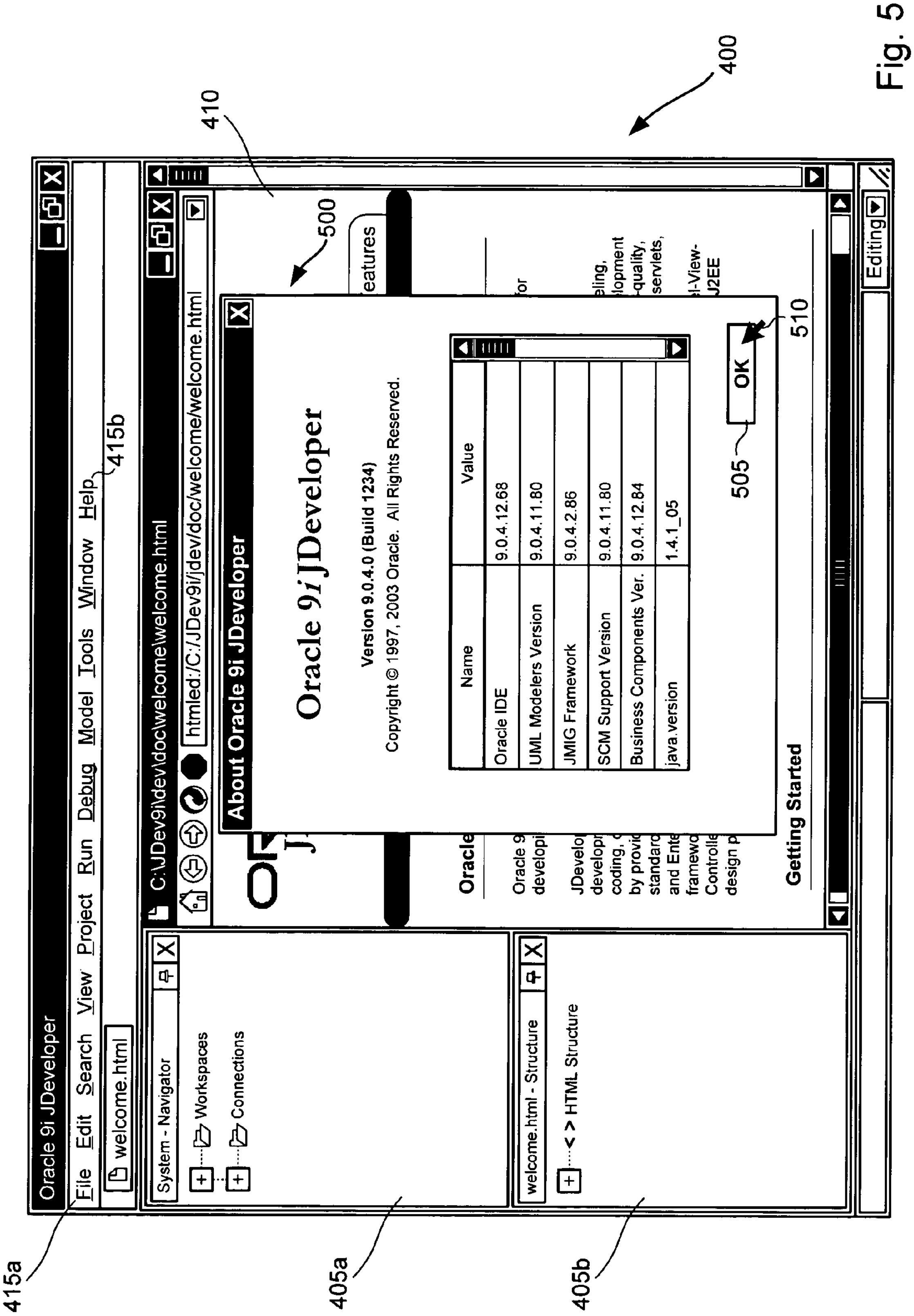
FIG. 5 is an exemplary screen display illustrating the integrated development environment of FIG. 4 during the testing of a software program in accordance with various embodiments of the invention.

As discussed in detail above, certain embodiments of the invention can identify components in response to triggers. As one example of different triggers that may be implemented, FIG. 5 illustrates the screen display shown in FIG. 4, after the user has selected an "About" item (not shown) from the Help menu 415*b*, invoking a help window 500. Specifically, the manipulation of the mouse button while the cursor is on the Help menu bar 415*b* can both invoke a Help menu and serve as a trigger for the test API. Further manipulation of the mouse button while on the "About" entry on the Help menu (not shown) likewise can both invoke a help window 500 and serve as an additional trigger for the test API. Finally, while the cursor 510 is positioned over the "OK" button 505 of the help window 500, a hotkey may be pressed, simulating the manipulation of the mouse button at that point but not actually invoking any method associated with that OK button 505. (Alternatively, the mouse button could be pressed, which could serve as a trigger and also invoke the OK button 505.)

Figure 6:
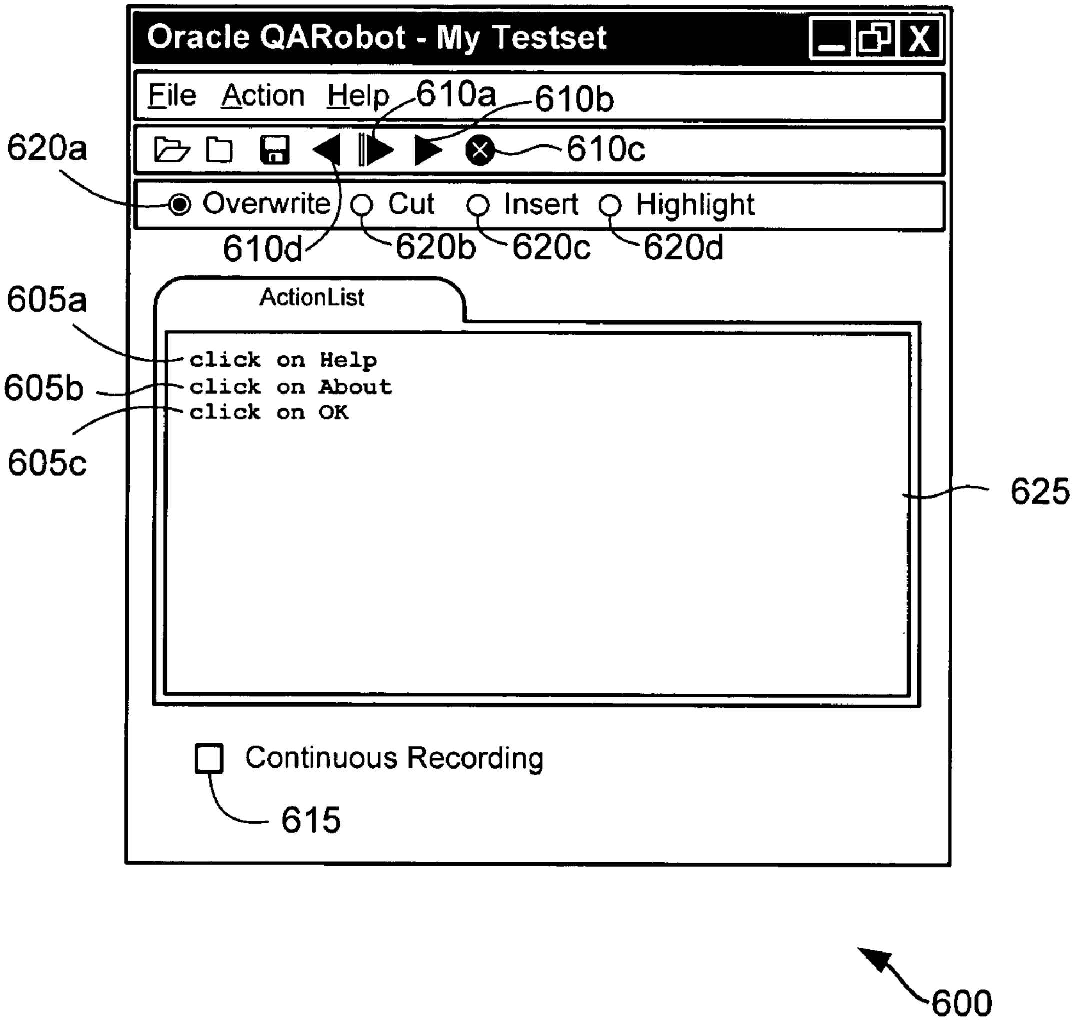
FIG. 6 is an exemplary screen display illustrating an interface for testing a software program using the integrated development environment of FIG. 4 in accordance with various embodiments of the invention.

FIG. 6 illustrates an exemplary window 600 that can be used by the test API to allow a user to track triggers, events and/or identified components, as well as configure the behavior of the test API. As illustrated, the window 600 includes a sub-window 625 with selectable entries for recorded actions/events/components. The exemplary window 600 illustrates the status of the test API in response to the user actions described with respect to FIG. 5. Hence, the sub-window 625 includes entries for a "click on Help" event 605*a*, a "click on About" event 605*b* and a "click on OK" event 605*c*. Notably, the "click on OK" event has been recorded by the test API even though the event was merely emulated by the use of a hotkey, as described above. The entries 605 in the sub-window 625 can correspond to items recorded as described with respect to block 325 on FIG. 3, which may, as described above, be recorded in RAM, a database and/or a file. Optionally, items initially may be recorded in RAM and displayed in the sub-window 625, and the window 600 can include a control for instructing the test API to write the recorded items to a database, file, etc.

The window 600 can also include, in addition to standard menus and tool bar buttons, controls for configuring the behavior of the test API. For instance, the exemplary window includes a control 610*a* for instructing the test API to replay all recorded actions and a control 610*b* for instructing the test API to replay recorded events beginning with a particular event (e.g., an event highlighted in the sub-window 625) and/or to replay a particular series of events (e.g., all—or a subset—of the events in the sub-window 625). The window 600 can also include a control 610*c* for removing a particular event from the replay list (and/or deleting the record of the associated component, if desired) and/or a control 610*d* for setting replay options for a particular event (e.g., setting and/or modifying certain feedback parameters described with respect to the exemplary XML file below). Thus, depending on the implementation, one or more of the controls 610 can be configured as desired to allow the modification of the record of particular component(s)/event(s) and/or merely to control the replay of one or more events on a one-time basis, without modifying the record of those events and/or their associated components. As mentioned above, the test API can be configured to record events continuously, and this behavior can be managed, for example, with a checkbox 615.

The window 600 can also include controls (e.g., 620) to allow the user to configure the behavior of events during replay. These controls 620 can be universal and/or can depend upon the type of component identified. For instance, controls 620 can specify how a text component should be treated during replay of an event: The text of the component may be, inter alia, overwritten (by selection of option 620*a*), cut (by selection of option 620*b*), inserted (by selection of option 620*c*) and/or highlighted (by selection of option 620*d*). Based on the disclosure herein, those skilled in the art will appreciate that other various options may be specified for different component types in a similar manner. These options can be selected at the time of recording (identification of the component) and/or during replay of an event, as described above (e.g., with respect to block 355 on FIG. 3B). Optionally, different options may be displayed depending on the selected entry in the sub-window 625; alternatively, all options may be displayed, regardless of the type of component selected (some options may not be selectable for certain component types).

In particular embodiments, a particular option may be pre-selected based on the triggering event that caused the identification of the pertinent component. Thus, for instance, if the triggering event was the highlighting of a portion of text, the "highlight" option (620*d*) may be pre-selected, although the user may be allowed to select a different option for replaying the event.

Figure 7:
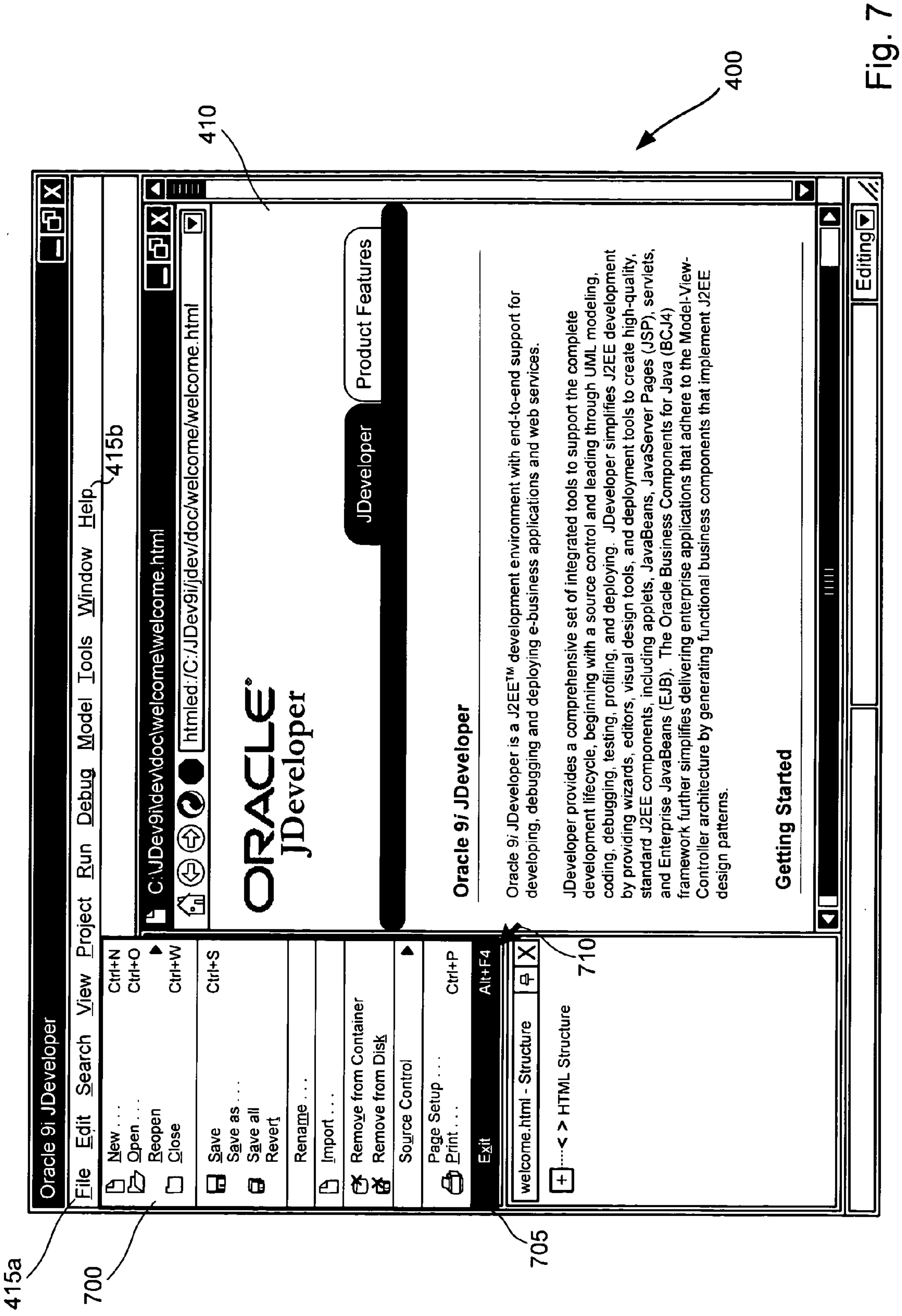
FIG. 7 is an exemplary screen display illustrating the integrated development environment of FIG. 4 during the testing of a software program in accordance with various embodiments of the invention.
Figure 8:
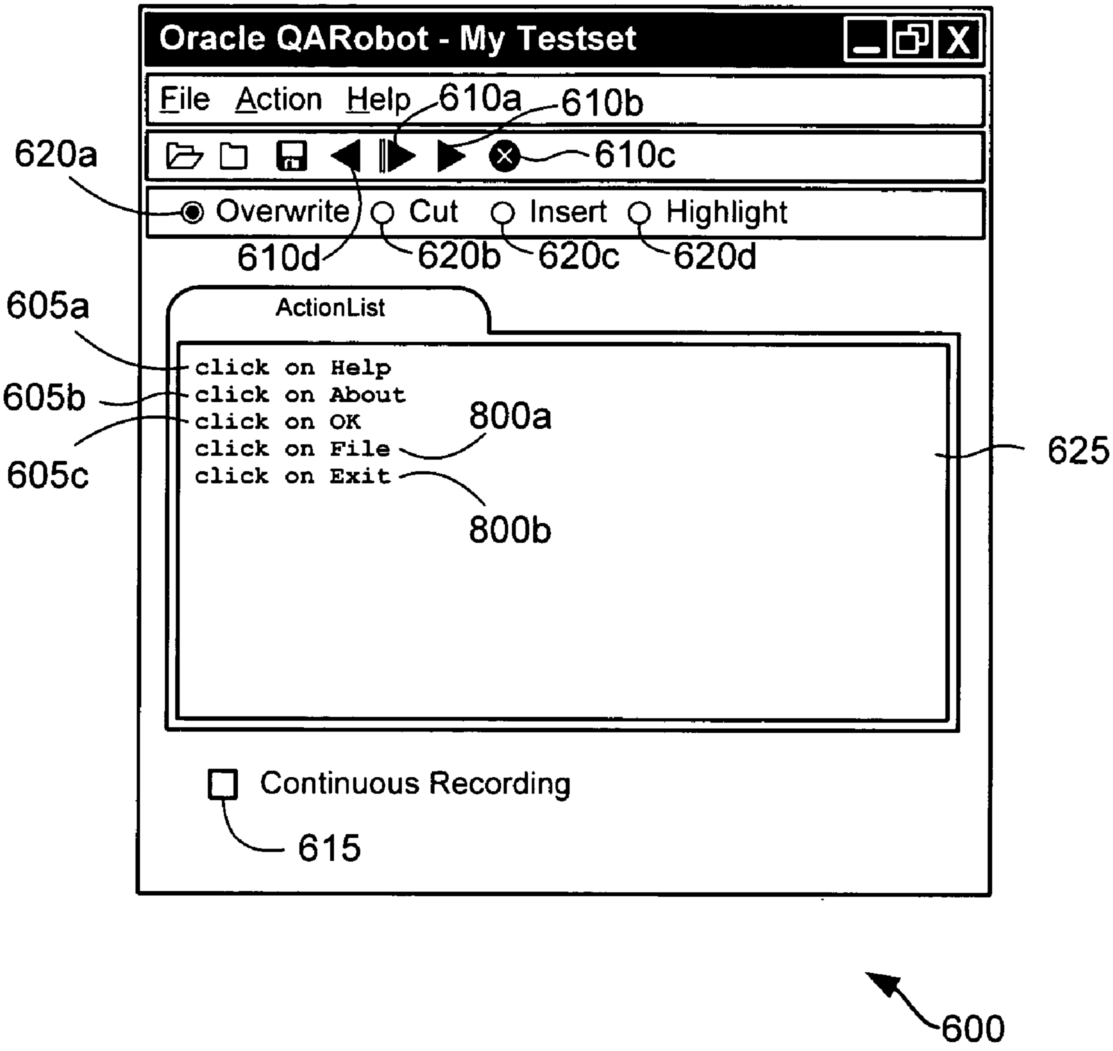
FIG. 8 is an exemplary screen display illustrating an interface for testing a software program using the integrated development environment of FIG. 4 in accordance with various embodiments of the invention.

Turning now to FIG. 7, display screen 400 is again illustrated. In FIG. 7, however, the user has selected the "File" menu 415*a* and has placed the cursor 710 on the "Exit" menu item 710. As described above, selection of the File menu 415*a* can trigger recording of that event, and pressing a hotkey with the cursor 710 in place can trigger recording of an emulated selection of the "Exit" item. FIG. 8 illustrates the test API window 600 of FIG. 6, with added entries for newly-recorded events 800 corresponding to the actions discussed with respect to FIG. 7.

As mentioned above, certain embodiments allow a record of identified components to be saved to a data structure, including, inter alia, a file, and specifically, an XML file. As noted above, this data structure can serve as a test script for replaying recorded events; in some embodiments, the test script can be modified (manually and/or automatically) to test operations under specified circumstances. One example of such a data structure, in particular, an XML file, which can correspond to the events discussed with respect to FIGS. 4-8, is presented below:

```
<?xml version = '1.0' encoding = 'UTF-8'?>
<?testAPI fileversion=1.3?>
<ACTIONLIST>
<ACTIONLISTNAME>oracle.ideimpl.MainWindowImpl#frame1</ACTIONLISTNAME>
 <ACTIONELEM>
```

-continued

```
    <ACTIONCONTEXT>
      <NAME>
        <DATA>
          <STRING>
            <![CDATA[Help]]>
          </STRING>
        </DATA>
      </NAME>
      <DESCRIPTION>
        <DATA>
          <NULLSTRING/>
        </DATA>
      </DESCRIPTION>
      <ROLE>22</ROLE>
      <COMPONENT>
        <DATA>
          <STRING>
            <![CDATA[oracle.ide.Menubar$JTopMenu]]>
          </STRING>
        </DATA>
      </COMPONENT>
      <PARENTCOMP>
        <DATA>
          <STRING>
            <![CDATA[oracle.ide.Menubar$1]]>
          </STRING>
        </DATA>
      </PARENTCOMP>
      <FEEDBACK ISFEEDBACK="false" ENABLED="true" SELECTED="true"
CHECKTYPE="0" SLEEPINTERVAL="0" MAXSLEEPTIME="0" SLEEPTYPE="0">
        <DATA>
          <NULLSTRING/>
        </DATA>
      </FEEDBACK>
      <MOUSEINFO MOUSEACTION="16" MOUSECLICKCOUNT="1" MOUSEPOSX="1"
MOUSEPOSY="1"/>
      <ACTION>
        <ACTIONCOUNT>
          <DATA>
            <STRING>
              <![CDATA[0]]>
            </STRING>
          </DATA>
        </ACTIONCOUNT>
        <ACTIONDESCRIPTION>
          <DATA>
            <STRING>
              <![CDATA[click]]>
            </STRING>
          </DATA>
        </ACTIONDESCRIPTION>
      </ACTION>
      <CLASSID>class javax.swing.JMenu$AccessibleJMenu</CLASSID>
    </ACTIONCONTEXT>
    <ACTIONTYPE>
      <COMMON/>
    </ACTIONTYPE>
  </ACTIONELEM>
  <ACTIONELEM>
    <ACTIONCONTEXT>
      <NAME>
        <DATA>
          <STRING>
            <![CDATA[About]]>
          </STRING>
        </DATA>
      </NAME>
      <DESCRIPTION>
        <DATA>
          <NULLSTRING/>
        </DATA>
      </DESCRIPTION>
      <ROLE>24</ROLE>
      <COMPONENT>
        <DATA>
          <STRING>
            <![CDATA[oracle.ide.controls.MenuItem]]>
          </STRING>
        </DATA>
```

-continued

```
        </COMPONENT>
        <PARENTCOMP>
          <DATA>
            <STRING>
              <![CDATA[javax.swing.JPopupMenu]]>
            </STRING>
          </DATA>
        </PARENTCOMP>
        <FEEDBACK ISFEEDBACK=“false” ENABLED=“true” SELECTED=“false”
CHECKTYPE=“0” SLEEPINTERVAL=“0” MAXSLEEPTIME=“0” SLEEPTYPE=“0”>
          <DATA>
            <NULLSTRING/>
          </DATA>
        </FEEDBACK>
        <MOUSEINFO MOUSEACTION=“16” MOUSECLICKCOUNT=“1” MOUSEPOSX=“1”
MOUSEPOSY=“1”/>
        <ACTION>
          <ACTIONCOUNT>
            <DATA>
              <STRING>
                <![CDATA[0]]>
              </STRING>
            </DATA>
          </ACTIONCOUNT>
          <ACTIONDESCRIPTION>
            <DATA>
              <STRING>
                <![CDATA[click]]>
              </STRING>
            </DATA>
          </ACTIONDESCRIPTION>
        </ACTION>
        <CLASSID>class
javax.swing.JMenuItem$AccessibleJMenuItem</CLASSID>
      </ACTIONCONTEXT>
      <ACTIONTYPE>
        <COMMON/>
      </ACTIONTYPE>
    </ACTIONELEM>
    <ACTIONELEM>
      <ACTIONCONTEXT>
        <NAME>
          <DATA>
            <STRING>
              <![CDATA[OK]]>
            </STRING>
          </DATA>
        </NAME>
        <DESCRIPTION>
          <DATA>
            <NULLSTRING/>
          </DATA>
        </DESCRIPTION>
        <ROLE>32</ROLE>
        <COMPONENT>
          <DATA>
            <STRING>
              <![CDATA[javax.swing.JButton]]>
            </STRING>
          </DATA>
        </COMPONENT>
        <PARENTCOMP>
          <DATA>
            <STRING>
              <![CDATA[oracle.bali.ewt.button.DialogButtonBar]]>
            </STRING>
          </DATA>
        </PARENTCOMP>
        <FEEDBACK ISFEEDBACK=“false” ENABLED=“true” SELECTED=“false”
CHECKTYPE=“0” SLEEPINTERVAL=“0” MAXSLEEPTIME=“0” SLEEPTYPE=“0”>
          <DATA>
            <NULLSTRING/>
          </DATA>
        </FEEDBACK>
        <MOUSEINFO MOUSEACTION=“16” MOUSECLICKCOUNT=“1” MOUSEPOSX=“1”
MOUSEPOSY=“1”/>
        <ACTION>
          <ACTIONCOUNT>
            <DATA>
```

-continued

```
          <STRING>
            <![CDATA[0]]>
          </STRING>
        </DATA>
      </ACTIONCOUNT>
      <ACTIONDESCRIPTION>
        <DATA>
          STRING>
            <![CDATA[click]]>
          </STRING>
        </DATA>
      </ACTIONDESCRIPTION>
    </ACTION>
    <CLASSID>class
 javax.swing.JButton$AccessibleJButton</CLASSID>
  </ACTIONCONTEXT>
  <ACTIONTYPE>
    <COMMON/>
  </ACTIONTYPE>
</ACTIONELEM>
<ACTIONELEM>
  <ACTIONCONTEXT>
    <NAME>
      <DATA>
        <STRING>
          <![CDATA[File]]>
        </STRING>
      </DATA>
    </NAME>
      <DESCRIPTION>
      <DATA>
        <NULLSTRING/>
      </DATA>
    </DESCRIPTION>
    <ROLE>22</ROLE>
    <COMPONENT>
      <DATA>
        <STRING>
          <![CDATA[oracle.ide.Menubar$JTopMenu]]>
      </STRING>
    </DATA>
  </COMPONENT>
  <PARENTCOMP>
    <DATA>
      <STRING>
        <![CDATA[oracle.ide.Menubar$1]]>
      </STRING>
    </DATA>
  </PARENTCOMP>
  <FEEDBACK ISFEEDBACK="false" ENABLED="true" SELECTED="false"
CHECKTYPE="0" SLEEPINTERVAL="0" MAXSLEEPTIME="0" SLEEPTYPE="0">
    <DATA>
      <NULLSTRING/>
    </DATA>
  </FEEDBACK>
  <MOUSEINFO MOUSEACTION="16" MOUSECLICKCOUNT="1" MOUSEPOSX="2"
MOUSEPOSY="2"/>
  <ACTION>
    <ACTIONCOUNT>
      <DATA>
        <STRING>
          <![CDATA[0]]>
        </STRING>
      </DATA>
    </ACTIONCOUNT>
    <ACTIONDESCRIPTION>
      <DATA>
        <STRING>
          <![CDATA[click]]>
        </STRING>
      </DATA>
    </ACTIONDESCRIP        TION>
  </ACTION>
  <CLASSID>class javax.swing.JMenu$AccessibleJMenu</CLASSID>
</ACTIONCONTEXT>
<ACTIONTYPE>
  <COMMON/>
</ACTIONTYPE>
</ACTIONELEM>
```

-continued

```
<ACTIONELEM>
 <ACTIONCONTEXT>
   <NAME>
     <DATA>
       <STRING>
         <![CDATA[Exit]]>
       </STRING>
     </DATA>
   </NAME>
   <DESCRIPTION>
     <DATA>
       <NULLSTRING/>
     </DATA>
   </DESCRIPTION>
   <ROLE>24</ROLE>
   <COMPONENT>
     <DATA>
       <STRING>
         <![CDATA[oracle.ide.controls.MenuItem]]>
       </STRING>
     </DATA>
     </COMPONENT>
     <PARENTCOMP>
       <DATA>
         <STRING>
           <![CDATA[javax.swing.JPopupMenu]]>
         </STRING>
       </DATA>
     </PARENTCOMP>
     <FEEDBACK ISFEEDBACK="false" ENABLED="true" SELECTED="false"
CHECKTYPE="0" SLEEPINTERVAL="0" MAXSLEEPTIME="0" SLEEPTYPE="0">
       <DATA>
         <NULLSTRING/>
       </DATA>
     </FEEDBACK>
     <MOUSEINFO MOUSEACTION="16" MOUSECLICKCOUNT="1" MOUSEPOSX="2"
MOUSEPOSY="2"/>
     <ACTION>
       <ACTIONCOUNT>
         <DATA>
             <STRING>
             <![CDATA[0]]>
           </STRING>
         </DATA>
       </ACTIONCOUNT>
       <ACTIONDESCRIPTION>
         <DATA>
           <STRING>
             <![CDATA[click]]>
           </STRING>
         </DATA>
       </ACTIONDESCRIPTION>
     </ACTION>
     <CLASSID>class
javax.swing.JMenuItem$AccessibleJMenuItem</CLASSID>
   </ACTIONCONTEXT>
   <ACTIONTYPE>
     <COMMON/>
   </ACTIONTYPE>
 </ACTIONELEM>
</ACTIONLIST>
```

This example XML file is included herein merely to illustrate one of several methods of recording identified components in accordance with various embodiments of the invention. Based on this disclosure, those skilled in the art will understand that, depending on the embodiment, various structural and/or syntactic modifications may be made, such as the inclusion of additional information about identified components and/or triggering events, the omission of unnecessary information, and the like. Additionally, those skilled in the art are assumed to be familiar with XML formatting standards, and the standard conventions of the above example file will not be explained in depth.

The file can include one or more records for each of the items 605, 800 listed, for example, on FIG. 8. A set of related records (e.g., a set of records of components identified in a given test regime) can be tagged with an <ACTIONLIST> tag. In this way, if desired, a single XML file can include records from a plurality of test sessions and/or regimes, each as part of a separate <ACTIONLIST> element. Each record can be tagged with an <ACTIONELEM> tag, identifying that element as a separate record of an identified component and/or event. Thus, in the illustrated example, there are five <ACTIONELEM> records, corresponding to the five items 605_a_, 605_b_, 605_c_, 800_a_, 800_b_ in the sub-window 625 of FIG. 8.

Within each <ACTIONELEM> record, the accessible context of the identified component can be identified, e.g., using the <NAME> element of the <ACTIONCONTEXT> container. Similarly, the accessible role of the component can be identified, e.g., using the <ROLE> element of that container, and the component can be identified (by class, if appropriate), e.g., using the <COMPONENT> element of that container. Other information optionally can be included as well. Merely by way of example, information about any triggering event (and/or emulated event) can be included within the <ACTION> element, and information about the class to which the event belongs can be included, e.g., in the <CLASSID> element. Additionally, information about the component's parent can be included, e.g., in the <PARENTCOMP> element. Thus, if the identified component is a menu item, for example, the parent component (which may be the menu itself) can be identified in this element.

Optionally, certain embodiments may include testing parameters in the XML file. Merely by way of example, the <FEEDBACK> element can specify how a particular component is to be tested. Hence, parameters in this element can specify a desired status for the component (e.g., whether the component comprises a particular value, such a specified string, etc.), whether the test API should wait for that status before proceeding with testing, how long the test API should wait, on what time (and/or other) interval the test API should check for the status of that component, whether the test API should wait for a specified interval and/or program state before checking the status, and the like. Other parameters, such whether a component/operation should be tested iteratively, on a delayed basis, etc., can be included as well.

Hence, various embodiments of the invention provide inventive methods, data structures and systems for testing software programs. The description above identifies certain exemplary embodiments for implementing the invention, but those skilled in the art will recognize that many modifications and variations are possible within the scope of the invention. The invention, therefore, is defined only by the claims set forth below.

What is claimed is:

1. In an object-oriented environment, a method of testing a software program comprising a plurality of components executed on one of a plurality of operating systems for compliance with Americans with Disabilities Act (ADA) requirements, the method comprising:

determining, in response to a trigger, a cursor position, wherein the trigger comprises a user manipulating a hotkey on a keyboard, and wherein the hotkey is associated with an event;

ascertaining, based on the cursor position, an accessibility context associated with the cursor position;

identifying a component by reference to the accessibility context, wherein the accessibility context has an accessibility role that defines a set of properties, including at least one program method, associated with the accessibility context, wherein the identified component comprises the set of properties;

identifying an action to be taken by the identified component in response to the event associated with the hotkey, and emulating that action by recording, in real time and independent of any of the plurality of operating systems, the identified accessibility context and action, without causing the program to perform the action, wherein the recording of the identified accessibility context is an operating system independent process;

retrieving the stored accessibility context;

searching a component hierarchy for an object having an accessibility context matching the retrieved accessibility context; and playing back the action associated with the event based on the stored accessibility context to test the action associated with the event in reference to the accessibility context.

2. A method as recited in claim 1, wherein the object comprises the set of properties, including the at least one program method, defined by the accessibility role.

3. A method as recited in claim 1, wherein the associated event comprises the execution of the program method a first time.

4. A method as recited in claim 3, wherein replaying the action comprises executing the program method a second time.

5. A method as recited in claim 1, wherein the associated event comprises a cursor entering a field.

6. A method as recited in claim 1, wherein the associated event comprises a cursor exiting a field.

7. A method as recited in claim 1, wherein the associated event comprises a user manipulating a mouse button.

8. A method as recited in claim 1, further comprising creating a record of the identified component.

9. A method as recited in claim 8, further comprising manually modifying the record of the component.

10. A method as recited in claim 9, wherein manually modifying the record of the component comprises changing a property of the component.

11. A method as recited in claim 9, wherein manually modifying the record of the component comprises changing an accessibility role of the component.

12. A method as recited in claim 9, wherein manually modifying the record of the component comprises identifying a different program method to be executed in replaying an event.

13. A method as recited in claim 8, wherein the record is incorporated in a file.

14. A method as recited in claim 13, wherein the file is an XML file.

15. A method as recited in claim 1, wherein the component comprises a button.

16. A method as recited in claim 15, wherein the program method performs an action related to the selection of the button.

17. A method as recited in claim 1, wherein the component comprises a window.

18. A method as recited in claim 17, wherein the program method performs an action selected from the group consisting of opening the window, closing the window, resizing the window, and moving the window.

19. A method as recited in claim 1, wherein the component comprises a selectable component.

20. A method as recited in claim 19, wherein the program method performs an action selected from the group consisting of selecting the component and deselecting the component.

21. A method as recited in claim 1, wherein the component comprises a portion of text.

22. A method as recited in claim 21, wherein the program method performs an action selected from the group consisting of cutting the portion of text, copying the portion of text, pasting the portion of text and formatting the portion of text.

23. A method as recited in claim 1, further comprising, performing, for a plurality of iterations, the steps of determining a cursor position relative to a component, ascertaining an accessibility context, and identifying the component.

24. A method as recited in claim 23, further comprising creating a plurality of records, each of the plurality of records comprising a component identified in one of the plurality of iterations.

25. A method as recited in claim 24, further comprising, with respect to each of the plurality of records, searching a component hierarchy for an object having an accessibility context matching the identified component's accessibility context and replaying an event by calling a program method defined by an accessibility role for the object.

26. A method as recited in claim 1, wherein replaying the event comprises displaying a result of the event on a display device.

27. A method as recited in claim 1, wherein replaying the event comprises writing a result of the event to a file.

28. A method as recited in claim 1, further comprising, after replaying the event, evaluating a result of the event.

29. A method as recited in claim 28, wherein evaluating a result of the event comprises comparing the result of the event with an anticipated result of the event.

30. A method as recited in claim 1, further comprising analyzing the event to determine whether the component complies with legal requirements for accommodating persons with disabilities.

31. A computer program product for testing a software program comprising a plurality of components executed on one of a plurality of operating systems for compliance with Americans with Disabilities Act (ADA) requirements, the computer program product being embodied in a computer readable storage medium and comprising instructions executable by a computer to:

determine, in response to a trigger, a cursor position, wherein the trigger comprises a user manipulating a hotkey on a keyboard, and wherein the hotkey is associated with an event;

ascertain, based on the cursor position, an accessibility context associated with the cursor position;

identify a component by reference to the accessibility context, wherein the accessibility context has an accessibility role that defines a set of properties, including at least one program method, associated with the accessibility context, wherein the identified component comprises the set of properties;

search a component hierarchy for an object having an accessibility context matching the component's accessibility context;

identifying an action to be taken by the identified component in response to the event associated with the hotkey, and emulating that action by recording, in real time and independent of any of the plurality of operating systems, the identified accessibility context and action, without causing the program to perform the action, wherein the recording of the identified accessibility context is an operating system independent process;

retrieve the stored accessibility context; and play back the action associated with the event based on the stored accessibility context to test the action associated with the event in reference to the accessibility context.

32. A system for testing a software program comprising a plurality of components executed on one of a plurality of operating systems for compliance with Americans with Disabilities Act (ADA) requirements, the system comprising:

a processor;

an input device in communication with the processor; and a computer readable medium in communication with the processor, the computer readable medium comprising instructions executable by the processor to:

determine, in response to a trigger, a cursor position, wherein the trigger comprises a user manipulating a hotkey on a keyboard, and wherein the hotkey is associated with an event;

ascertain, based on the cursor position, an accessibility context associated with the cursor position;

identify a component by reference to the accessibility context, wherein the accessibility context has an accessibility role that defines a set of properties, including at least one program method, associated with the accessibility context, wherein the identified component comprises the set of properties;

identifying an action to be taken by the identified component in response to the event associated with the hotkey, and emulating that action by recording, in real time and independent of any of the plurality of operating systems, the identified accessibility context and action, without causing the program to perform the action, wherein the recording of the identified accessibility context is an operating system independent process;

retrieve the stored accessibility context;

search a component hierarchy for an object having an accessibility context matching the retrieved accessibility context; and play back the action associated with the event based on the stored accessibility context to test the action associated with the event in reference to the accessibility context.

33. A system as recited in claim 32, wherein the input device is a mouse having at least one button, and wherein the trigger comprises manipulation of the button.

34. A system as recited in claim 32, further comprising a display device in communication with the processor, wherein replaying the event comprises displaying the result of the event on the display device.

35. In an object-oriented environment, a method of determining a software program's compliance with legal requirements for accommodating persons with disabilities, the software program comprising a plurality of components executed on one of a plurality of operating systems, the method comprising:

determining, in response to a trigger, a cursor position, wherein the trigger comprises a user manipulating a hotkey on a keyboard, and wherein the hotkey is associated with an event;

ascertaining, based on the cursor position, an accessibility context associated with the cursor position;

identifying a component by reference to the accessibility context, wherein the accessibility context has an accessibility role that defines a set of properties, including at least one program method, associated with the accessibility context, wherein the identified component comprises the set of properties;

identifying an action to be taken by the identified component in response to the event associated with the hotkey, and emulating that action by recording, in real time and independent of any of the plurality of operating systems, the identified accessibility context and action, without causing the program to perform the action, wherein the recording of the identified accessibility context is an operating system independent process;

retrieving the stored accessibility context;

searching a component hierarchy for an object having an accessibility context matching the retrieved accessibility context;

playing back the stored action associated with the accessibility context to test the action functionality of the component in reference to the accessibility context and generating output with results of the functionality test;

analyzing the results to evaluate the component's compliance with legal requirements for accommodating persons with disabilities; and reporting, to a user, a report of an analysis.

36. A method as recited in claim 35, wherein analyzing the object comprises replaying an event by calling a program method defined by an accessibility role for the object.

37. A method as recited in claim 35, wherein analyzing the object comprises analyzing a set of properties of the object.

38. A method as recited in claim 35, wherein analyzing the object comprises evaluating the object's accessibility context to determine whether the component properly implements accessibility features.

39. A method as recited in claim 35, wherein analyzing the object comprises evaluating the object's accessibility role to determine whether the component properly implements accessibility features.

* * * * *

UNITED STATES PATENT AND TRADEMARK OFFICE

CERTIFICATE OF CORRECTION

PATENT NO. : 7,665,068 B2
APPLICATION NO. : 10/735482
DATED : February 16, 2010
INVENTOR(S) : Georg Neumann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. under 154(b) by 1219 days.

In column 7, line 24, delete "device,." and insert -- device, --, therefor.

In column 8, line 9, after "include" delete ",".

In column 21, line 8, before "STRING>" insert -- < --.

In column 21, line 72, delete "</ACTIONDESCRIP TION>" and insert -- </ACTIONDESCRIPTION> --, therefor.

Signed and Sealed this

Twelfth Day of October, 2010

David J. Kappos
*Director of the United States Patent and Trademark Office*